(12) United States Patent
Deng

(10) Patent No.: US 10,690,330 B2
(45) Date of Patent: Jun. 23, 2020

(54) MODULAR FAN

(71) Applicant: Dongguan Thinkcool Electronic Technology Co., Ltd., Dongguan (CN)

(72) Inventor: Haoqiang Deng, Dongguan (CN)

(73) Assignee: Dongguan Thinkcool Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 16/351,273

(22) Filed: Mar. 12, 2019

(65) Prior Publication Data

US 2019/0353181 A1 Nov. 21, 2019

(30) Foreign Application Priority Data

May 16, 2018 (CN) .......................... 2018 2 0735209

(51) Int. Cl.

| | |
|---|---|
| *F21V 33/00* | (2006.01) |
| *F21V 23/00* | (2015.01) |
| *F21V 15/01* | (2006.01) |
| *G06F 1/20* | (2006.01) |
| *F04D 25/16* | (2006.01) |
| *F21Y 115/10* | (2016.01) |
| *F21W 121/00* | (2006.01) |

(52) U.S. Cl.
CPC .......... *F21V 23/002* (2013.01); *F04D 25/166* (2013.01); *F21V 15/01* (2013.01); *F21V 33/0096* (2013.01); *G06F 1/20* (2013.01); *F21W 2121/00* (2013.01); *F21Y 2115/10* (2016.08)

(58) Field of Classification Search
CPC ............. A61L 2209/12; F21V 33/0088; F21V 33/0092; F21V 33/0096; F21V 15/01; F21V 23/002; F04D 25/166; F21W 2121/00; G06F 2200/201; H05K 7/20272
See application file for complete search history.

(56) References Cited

U.S. PATENT DOCUMENTS

| | | | | |
|---|---|---|---|---|
| 10,041,632 | B1* | 8/2018 | Hsieh | ...................... F21K 9/235 |
| 2001/0028842 | A1* | 10/2001 | Huang | .................... F04D 17/04 |
| | | | | 415/53.1 |
| 2011/0064561 | A1* | 3/2011 | Huang | .................. F04D 25/166 |
| | | | | 415/60 |
| 2012/0057973 | A1* | 3/2012 | Chen | .................. F04D 25/0613 |
| | | | | 415/213.1 |
| 2018/0017725 | A1* | 1/2018 | Fang | .................. F21V 33/0096 |

* cited by examiner

*Primary Examiner* — Y M. Quach Lee
(74) *Attorney, Agent, or Firm* — Wang Law Firm, Inc.

(57) ABSTRACT

A modular fan includes a casing and a heat dissipating module. The casing includes an outer frame, a first accommodating chamber and a second accommodating chamber, and the first and second accommodating chambers are disposed at both ends of the casing. The outer frame and the first and second accommodating chambers are integrally formed. The heat dissipating module includes a first fan and a second fan, and the first and second fans are accommodated in the first and second accommodating chambers respectively; four endpoints of the diagonals of the outer frame have a fixed portion. separately Compared with the conventional single fan required to be installed on a 240 mm-radiator one by one, the modular fan of the present invention can be installed on the 240 mm-radiator directly to reduce the inconvenience of installation. In addition, the invention provides a better heat dissipating efficiency than the conventional single fan.

6 Claims, 4 Drawing Sheets

MODULAR FAN

FIELD OF INVENTION

The present invention relates to the field of fans, in particular to a modular fan.

BACKGROUND OF INVENTION

1. Description of the Related Art

With the constant development of computer technology, personal computers gradually become a popular device used at home and an indispensable part of people's daily life. The personal computers turned from the previous custom machines manufactured by major computer manufacturers to the main-stream DIY personal computers. Now, people's economic conditions also allow them to upgrade their computers, and thus computer nerds such as DIY "hardware enthusiasts" appear.

Water cooling devices are common accessories used in DIY computer hardware, wherein water cooling is generally divided into integral water cooling and split water cooling. Compared with the split water cooling, the integral water cooling has a lower cost, and thus is the common type used for water cooling. The integral water cooling device is generally comprised of a radiator, a fan, a water pipe, and a water block, wherein the fan is mounted on the radiator and provided for cooling a cooling liquid after convection. At present, the 240 mm integral water-cooling fan dissipates heat by using two fans which are installed independently, and at least eight screws are required for the installation, and thus the installation is very inconvenient. In addition, the fans are independent, so that the heat dissipating efficiency is relatively low.

2. Summary of the Invention

Therefore, it is a primary objective of the present invention to overcome the drawbacks of the prior art by providing a modular fan. Compared with the conventional single fan required to be installed on a 240 mm-radiator one by one, the modular fan of the present invention can be installed on the 240 mm-radiator directly to reduce the inconvenience of installation. In addition, the invention provides a better heat dissipating efficiency than the conventional single fan.

To achieve the aforementioned and other objectives, the present invention discloses a modular fan comprising a casing and a heat dissipating module, characterized in that the casing comprises an outer frame, a first accommodating chamber and a second accommodating chamber, and the first accommodating chamber and the second accommodating chamber are disposed at both ends of the casing respectively, and the outer frame, the first accommodating chamber and the second accommodating chamber are integrally formed; the heat dissipating module comprises a first fan and a second fan, and the first fan is accommodated in the first accommodating chamber, and the second fan is accommodated in the second accommodating chamber; and the outer frame has a plurality of fixed portions disposed around the periphery of the outer frame.

Wherein, the first accommodating chamber and the second accommodating chamber are symmetrically disposed on both sides of the outer frame.

The modular fan further comprises a third accommodating chamber and a third fan, and the third fan is installed between the first fan and the second fan, the first accommodating chamber and the second accommodating chamber relative to the third accommodating chamber are symmetrically disposed on both sides of the outer frame.

Wherein, the outer frame has an LED lamp groove disposed around the periphery of the outer frame, and the lamp groove has an LED lamp strip installed therein.

Wherein, the LED lamp groove has a lamp cover mounted thereon.

Wherein, the casing further comprises a base, and the base comprises a first base, a second base, first wire groove, a second wire groove, a first fixed rod, a second fixed rod and a third fixed rod, and the first base and the second base are disposed at the center of the first accommodating chamber and the center of the second accommodating chamber respectively; the first wire groove has an end communicating with the outer frame and the other end communicating with the first base; the second wire groove has an end communicating with the first base and the other end communicating with the second base; the first fixed rod has an end coupled to the first base and the other end coupled to the LED lamp groove; the second fixed rod and the third fixed rod have an end coupled to the second base and the other end coupled to the LED lamp groove.

Wherein, the outer frame further comprises a wiring buckle disposed at the other end of the first wire groove.

Wherein, the fixed portion is a screw hole.

The present invention has the following advantageous effects:

The modular fan of the present invention comprises the casing and the heat dissipating module, and the casing comprises the outer frame, the first accommodating chamber and the second accommodating chamber, and the heat dissipating module comprises the first fan and the second fan installed in the first accommodating chamber and the second accommodating chamber respectively. Since the outer frame, the first accommodating chamber and the second accommodating chamber are integrally formed, and the fixed portions are disposed at the four endpoints of the diagonals of the outer frame, therefore the installation simply needs to mount the fan onto the radiator through the four fixed portions. Compared with the installation of the conventional fan, the modular fan of the invention simplifies the installation procedure by half. In addition, the outer frame, the first accommodating chamber and the second accommodating chamber of the invention are integrally formed, so that the size of the first accommodating chamber and the second accommodating chamber may be larger than the conventional fan accommodating chambers, and the first fan and the second fan of the invention may have a larger size, so as to provide a higher heat dissipating efficiency for the radiator of the same size.

DESCRIPTION OF THE PREFERRED EMBODIMENTS

Figure 1:
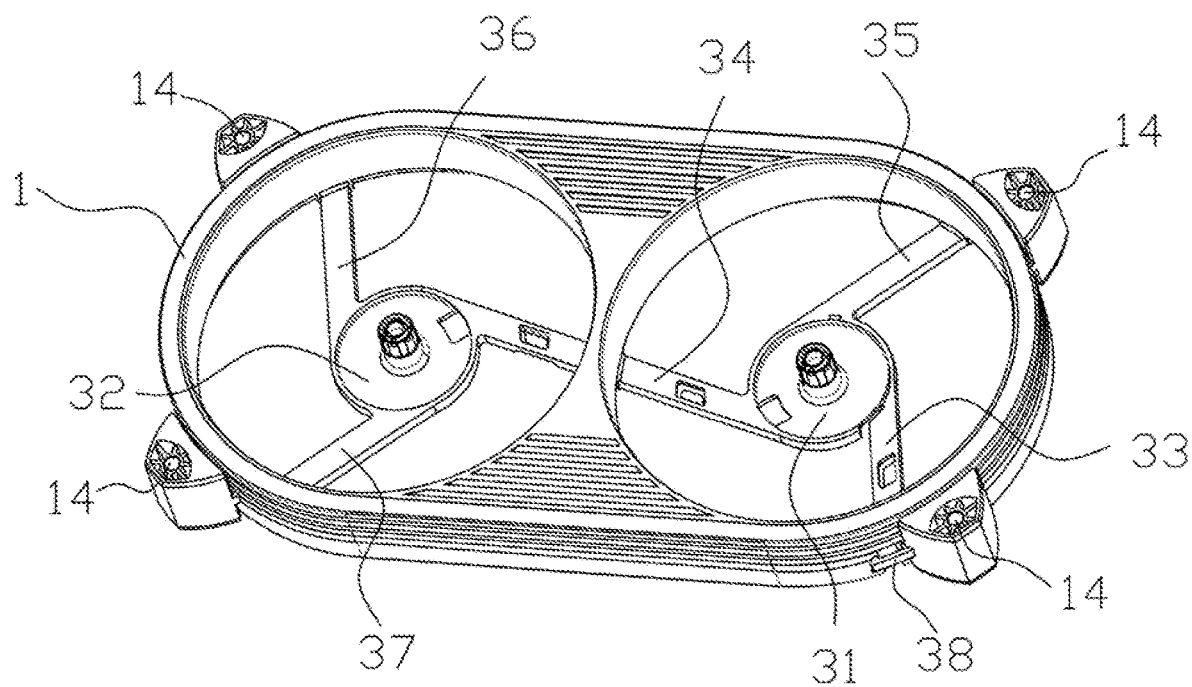
FIG. 1 is a schematic view of a first embodiment of a modular fan of the present invention.

To make it easier for our examiner to understand the objective of the invention, its structure, innovative features, and performance, we use preferred embodiments together with the attached drawings for the detailed description of the invention. It is noteworthy that only some embodiments of the present invention have been illustrated in the drawings, but it should be pointed out that many other modifications are conceivable within the scope of the following claims.

Exemplary embodiments are illustrated in referenced figures of the drawings. It is intended that the embodiments and figures disclosed herein are to be considered illustrative rather than restrictive.

Figure 2:
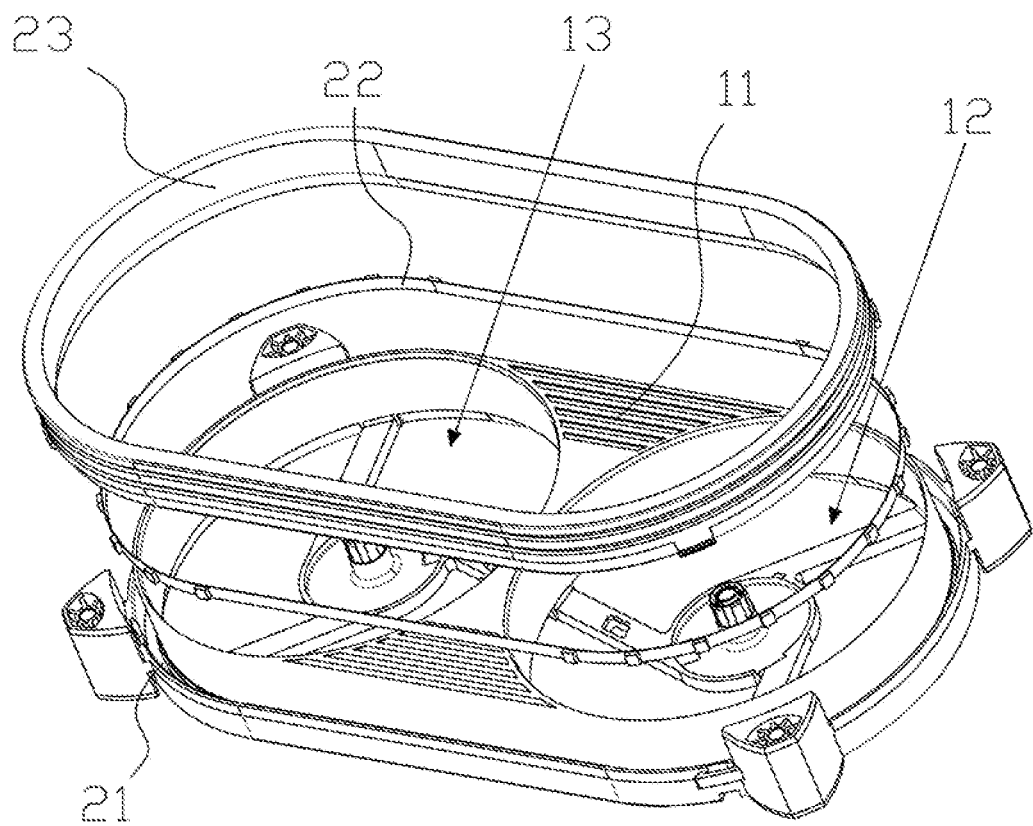
FIG. 2 is an exploded view of a first embodiment of a modular fan of the present invention.
Figure 3:
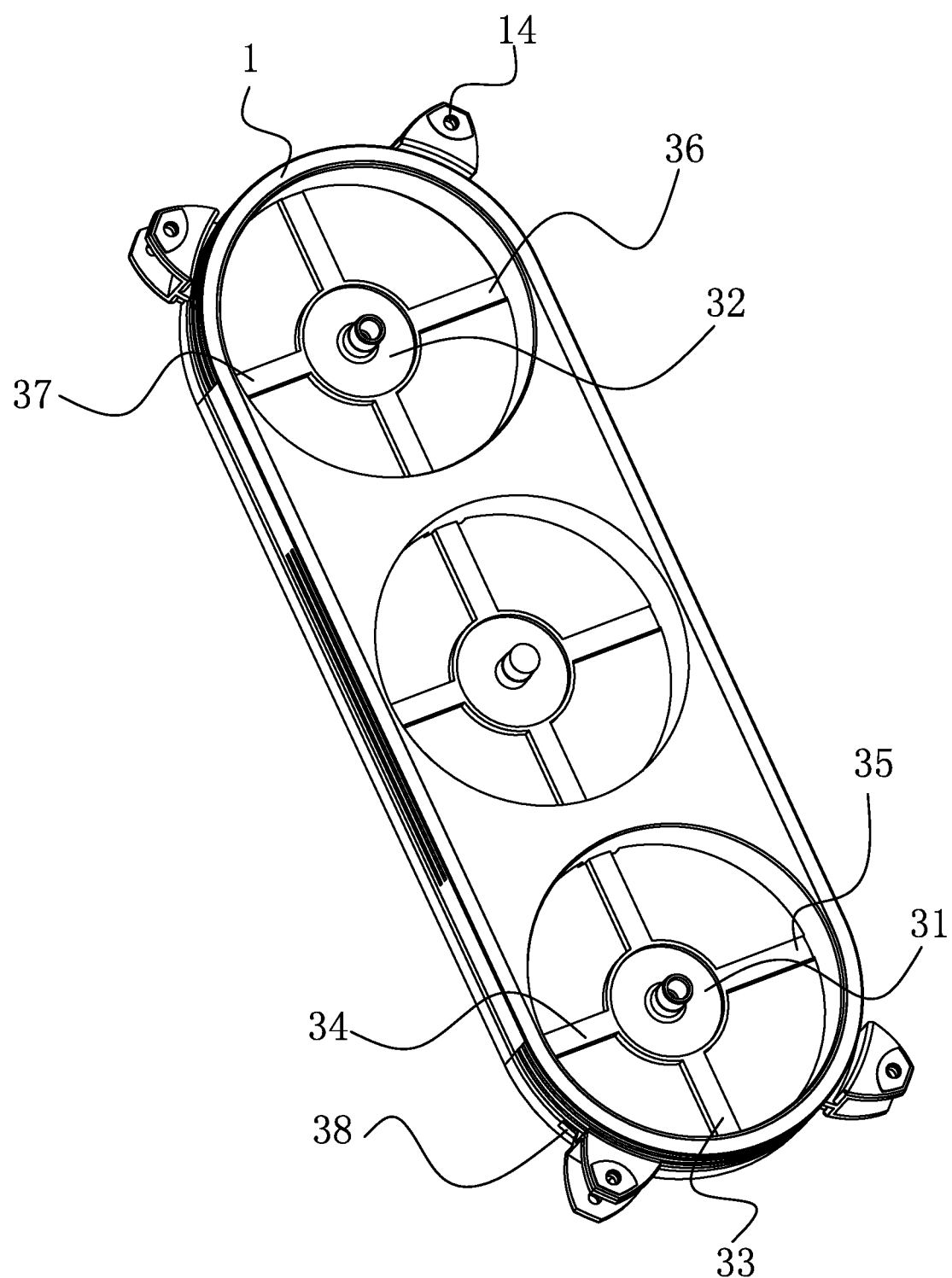
FIG. 3 is a schematic view of a second embodiment of a modular fan of the present invention.
Figure 4:
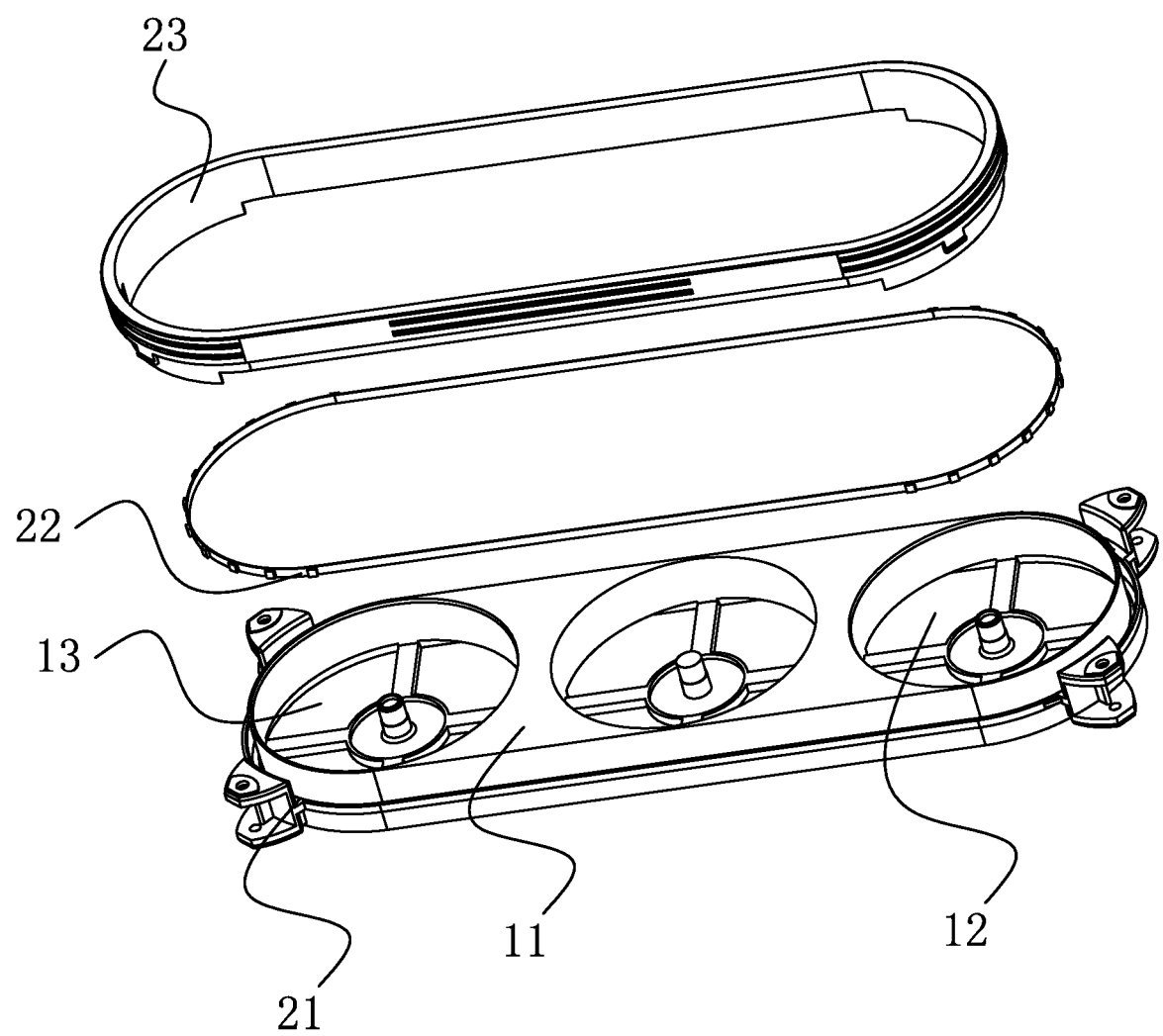
FIG. 4 is an exploded view of a second embodiment of a modular fan of the present invention.

With reference to FIGS. 1 and 2 for a modular fan of the present invention, the modular fan comprises a casing 1 and a heat dissipating module, and the casing 1 comprises an outer frame 11, a first accommodating chamber 12 and a second accommodating chamber 13 disposed at both ends of the casing 1 respectively, and the outer frame 11, the first accommodating chamber 12 and the second accommodating chamber 13 are integrally formed; the heat dissipating module comprises a first fan and a second fan, and the first fan is accommodated in the first accommodating chamber 12, and the second fan is accommodated in the second accommodating chamber 13; and the outer frame 11 has a plurality of fixed portions 14 disposed around the periphery thereof.

Specifically, the modular fan of this embodiment comprises a casing 1 and a heat dissipating module, and the casing 1 comprises an outer frame 11, a first accommodating chamber 12 and a second accommodating chamber 13, and the heat dissipating module comprises a first fan and a second fan; the first fan and the second fan are installed in the first accommodating chamber 12 and the second accommodating chamber 13 respectively. Since the outer frame 11, the first accommodating chamber 12, and the second accommodating chamber 13 are integrally formed, and the fixed portions 14 are disposed at the four endpoints of the periphery of the outer frame 11 respectively, therefore the installation of the fan of this embodiment can be mounted onto the radiator through the four fixed portions 14, wherein the fixed portions 14 of this embodiment are preferably screw holes. Compared with the installation of the conventional fan, the installation of the modular fan of the invention onto the radiator by using screws can simplify the installation procedure by half. In addition, the outer frame 11, the first accommodating chamber 12 and the second accommodating chamber 13 of this embodiment are integrally formed, so that the size of the first accommodating chamber 12 and the second accommodating chamber 13 may be greater than the size of the accommodating chambers of the conventional fan, and the first fan and the second fan may be a larger fan than the conventional fan. As a result, the radiator of the same size may have a higher heat dissipating efficiency.

In general, a single cooling fan has a size of 12 mm or 14 mm. The larger the fan vane, the more the energy consumed for the heat dissipation. In addition, the radiator is generally a cuboid which can be installed into the casing easily, so that the first accommodating chamber 12 and the second accommodating chamber 13 of this embodiment are symmetrically disposed on both sides of the outer frame 11 respectively.

The modular fan of this embodiment may be used and operated with the 240 mm and 280 mm radiators. Radiators having three or more cooling fans are available commercially, and the sizes of the three fans are 360 mm and 420 mm. This embodiment may further comprise a third accommodating chamber and a third fan, wherein the third fan is disposed between the first fan and the second fan, and the first accommodating chamber 12 and the second accommodating chamber 13 relative to the third accommodating chamber are symmetrically disposed on both sides of the casing 1 respectively. As a result, three fans of the size 360 mm or 420 mm may be mounted onto the radiator of the size 360 mm or 420 mm to meet a higher cooling efficiency.

In this embodiment, the LED lamp groove 21 is formed around the periphery of the outer frame 11, and the LED lamp strip 22 is installed into the lamp groove 21 to make the fan look more beautiful and dazzling. The lamp cover 23 is mounted onto the LED lamp groove 21, so that the fan of this embodiment has a display of 16,800,000 colors, and the light source scattering from the lamp cover 23 has becomes softer.

Specifically, the casing 1 further comprises a base, and the base comprises a first base 31, a second base 32, a first wire groove 33, a second wire groove 34, a first fixed rod 35, a second fixed rod 36 and a third fixed rod 37, and the first base 31 and the second base 32 are disposed at the center of the first accommodating chamber 12 and the center of the second accommodating chamber 13 respectively. The first base 31 and the second base 32 have a stator installed thereon, and the first fan and the second fan are mounted onto the first base 31 and the second base 32 respectively; the first wire groove 33 has an end communicating with the outer frame 11 and the other end communicating with the first base 31; the second wire groove 34 has an end communicating with the first base 31 and the other end communicating with the second base 32; the first fixed rod 35 has an end coupled to the first base 31 and the other end coupled to the LED lamp groove 21; the second fixed rod 36 and the third fixed rod 37 have an end coupled to the second base 32 and the other end coupled to the LED lamp groove 21. Since the fan of this embodiment is a modular fan, therefore the wire of each fan can be combined with each other for wiring, and the wiring buckle 38 is disposed on the outer side of the first wire groove 33 of the outer frame 11 and provided for a convenient wire management and an aesthetic appearance. In addition, the first fixed rod 35, the second fixed rod 36, and the third fixed rod 37 are provided for enhancing the overall strength of the fan.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A modular fan, comprising a casing and a heat dissipating module, wherein the casing comprises an outer frame, a first accommodating chamber and a second accommodating chamber, and the first accommodating chamber and the second accommodating chamber are disposed at both ends of the casing respectively, and the outer frame, the first accommodating chamber and the second accommodating chamber are integrally formed; the heat dissipating module comprises a first fan and a second fan, and the first fan is accommodated in the first accommodating chamber, and the second fan is accommodated in the second accommodating chamber; and the outer frame has a plurality of fixed portions disposed around a periphery of the outer frame;

wherein the casing further comprises a base, and the base comprises a first base, a second base, a first wire groove, a second wire groove, a first fixed rod, a second fixed rod, and a third fixed rod, and the first base and the second base are disposed at the center of the first accommodating chamber and the center of the second accommodating chamber respectively;

the first wire groove has an end communicating with the outer frame and an opposite end communicating with the first base;

the second wire groove has an end communicating with the first base and an opposite end communicating with the second base;

the first fixed rod has an end coupled to the first base and an opposite end coupled to the LED lamp groove;

the second fixed rod and the third fixed rod have an end coupled to the second base and an opposite end coupled to the LED lamp groove;

wherein the outer frame further comprises a wiring buckle disposed at the end of the first wire groove in communication with the outer frame.

2. The modular fan according to claim 1, wherein the first accommodating chamber and the second accommodating chamber are symmetrically disposed on both sides of the outer frame.

3. The modular fan according to claim 1, further comprising a third accommodating chamber and a third fan, and the third fan being installed between the first fan and the second fan, the first accommodating chamber and the second accommodating chamber relative to the third accommodating chamber being symmetrically disposed on both sides of the outer frame.

4. The modular fan according to claim 1, wherein the outer frame has an LED lamp groove disposed around the periphery of the outer frame, and the lamp groove has an LED lamp strip installed therein.

5. The modular fan according to claim 4, wherein the LED lamp groove has a lamp cover mounted thereon.

6. The modular fan according to claim 1, wherein the fixed portion is a screw hole.

* * * * *